(12) United States Patent
Bradley

(10) Patent No.: US 12,528,546 B2
(45) Date of Patent: Jan. 20, 2026

(54) AERODYNAMIC SYSTEM WITH REAR FAIRING HAVING A KICK OUT

(71) Applicant: Trailer Aerodynamics LLC, Chicago, IL (US)

(72) Inventor: Calvin Rhett Bradley, Blountville, TN (US)

(73) Assignee: Trailer Aerodynamics LLC, Chicago, IL (US)

( * ) Notice: Subject to any disclaimer, the term of this patent is extended or adjusted under 35 U.S.C. 154(b) by 434 days.

(21) Appl. No.: 18/254,040

(22) PCT Filed: Dec. 8, 2020

(86) PCT No.: PCT/US2020/063709
§ 371 (c)(1),
(2) Date: May 23, 2023

(87) PCT Pub. No.: WO2022/125062
PCT Pub. Date: Jun. 16, 2022

(65) Prior Publication Data
US 2024/0002001 A1 Jan. 4, 2024

(51) Int. Cl.
*B62D 35/00* (2006.01)
(52) U.S. Cl.
CPC .................................. *B62D 35/001* (2013.01)
(58) Field of Classification Search
CPC ............................. B62D 35/001; Y02T 10/82
See application file for complete search history.

(56) References Cited

U.S. PATENT DOCUMENTS

| | | | | |
|---|---|---|---|---|
| 4,640,541 A | * | 2/1987 | FitzGerald | B62D 25/168 296/180.1 |
| 11,352,075 B2 | | 6/2022 | Senatro et al. | |
| 2007/0120397 A1 | * | 5/2007 | Layfield | B62D 35/001 296/180.4 |
| 2013/0249241 A1 | | 9/2013 | Baker et al. | |

(Continued)

FOREIGN PATENT DOCUMENTS

EP    3284662 A1    2/2018

OTHER PUBLICATIONS

European Patent Office, Communication Pursuant to Article 94(3) EPC, Jun. 26, 2024, Application No. 20830448.5-1009, Munich, Germany.

(Continued)

*Primary Examiner* — Lori Lyjak

(57) ABSTRACT

An aerodynamic system (10) for a tractor trailer (12) is provided that has a rear fairing (18) configured for attachment to a trailer (16) of a tractor trailer. The trailer (16) has a cargo area (30) and the rear fairing (18) is configured for being located in the vertical direction lower than the cargo area (30). The rear fairing (18) has an air flow surface (32) facing outboard in the lateral direction, and a kick out (34) located at a tailing end (36) of the rear fairing (18) in the longitudinal direction. The kick out (34) has a kick out surface (40) that upon extension rearward in the longitudinal direction extends outboard in the lateral direction and then inboard in the lateral direction. The kick out (34) is located rearward of the forward trailer tire (28) in the longitudinal direction.

14 Claims, 11 Drawing Sheets

(56) References Cited

U.S. PATENT DOCUMENTS

| | | | |
|---|---|---|---|
| 2015/0259014 A1* | 9/2015 | Baker | B62D 35/001 296/180.4 |
| 2017/0029044 A1* | 2/2017 | Senatro | B62D 35/001 |
| 2018/0043944 A1* | 2/2018 | Magee | B62D 35/001 |
| 2018/0072354 A1* | 3/2018 | Cosme | B62D 35/001 |
| 2018/0093719 A1* | 4/2018 | Emery | B62D 35/001 |
| 2021/0001929 A1 | 1/2021 | Baxter | |

OTHER PUBLICATIONS

Canadian Intellectual Property Office, Examination Search Report, Oct. 15, 2024, Application No. 3,199,508, Gatineau, Quebec.

European Patent Office, International Search Report dated Aug. 24, 2021, pp. 1-13 (included), European Patent Office, Rijswijk, The Netherlands.

* cited by examiner

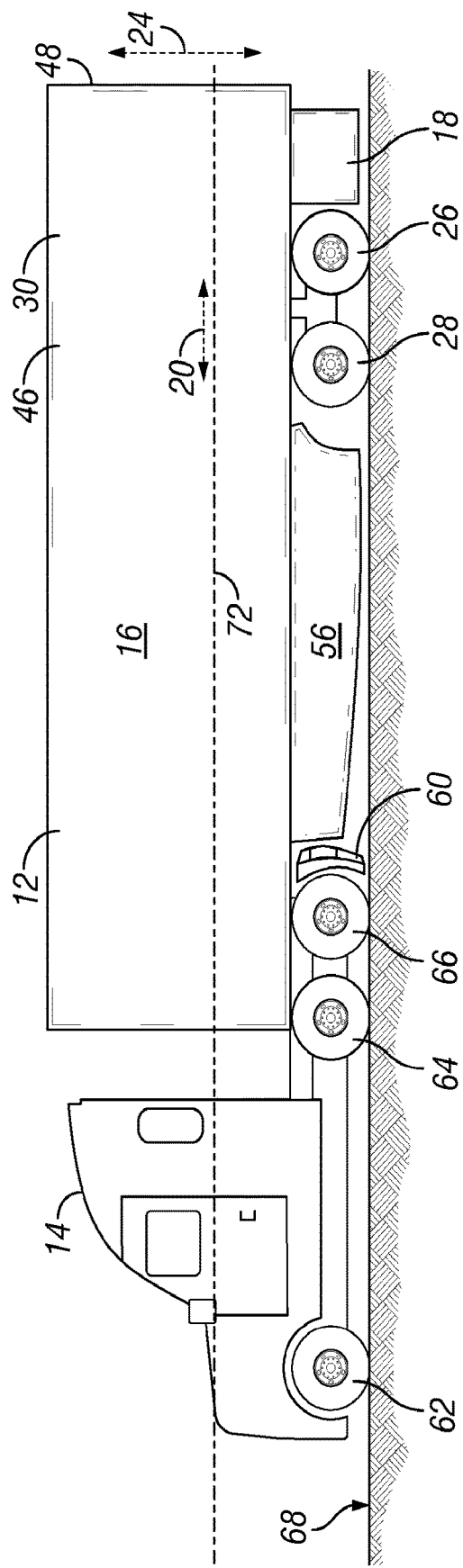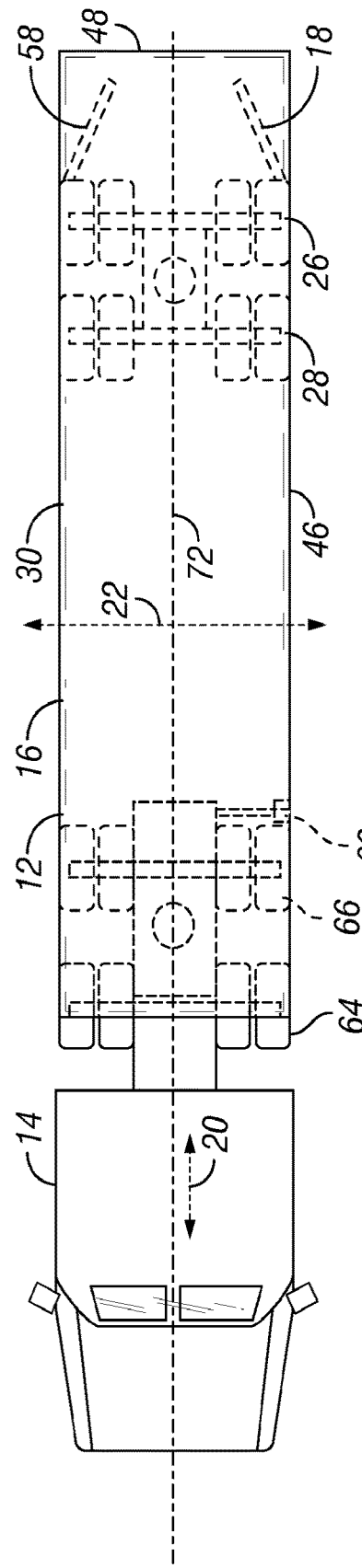
FIG. 1 (Prior Art)
FIG. 2 (Prior Art)

AERODYNAMIC SYSTEM WITH REAR FAIRING HAVING A KICK OUT

CROSS-REFERENCE TO RELATED APPLICATIONS

The present application is a 35 U.S.C. § 371 application of PCT/US2020/063709 filed on Dec. 8, 2020 and entitled "Aerodynamic System with Rear Fairing Having Kick Out" and claims benefit thereto. The entire contents of PCT/US2020/063709 are incorporated by reference herein in their entirety for all purposes.

FIELD OF THE INVENTION

The subject matter of the present invention relates to aerodynamic systems for tractor trailers. More particularly, the present application involves a rear fairing on a trailer that has a kick out that extends both outboard and inboard in the lateral direction that provides aerodynamic gains for the vehicle.

BACKGROUND OF THE INVENTION

The improvement of tractor trailer aerodynamics leads to reduced costs of driving the tractor trailer and improves environmental impacts. It is known to provide aerodynamic features onto the sides of tractor trailers for these purposes. FIGS. 1 and 2 show an example of a prior art tractor trailer 12 that includes components to increase aerodynamic efficiency. The tractor trailer 12 is made of a tractor 14 that hauls a trailer 16 that has a cargo area 30 into which cargo is transported. One of the aerodynamic components is a trailer skirt 56 located below the cargo area 30 of the trailer 16 that functions to prevent some of the high velocity air developed from travel from going under the tractor trailer 12 and impacting the wheels, axles, and other structures. The trailer skirt 56 does not extend forward all the way to the tires 66 of the tractor 14 because of the connection between the trailer 16 and the tractor 14 that requires space to be present to accommodate turning of the tractor 14 relative to the trailer 16. This gap may cause drag to be imparted onto the trailer 16 during travel. A forward fairing 60 is present and is carried at the end of the tractor 14 and located just rearward of the rearward drive tire 66. This forward fairing 60 likewise functions to deflect air in a desired manner to reduce aerodynamic drag of the vehicle.

A pair of rear fairings 18 and 58 are carried by the trailer 16 and function to channel the airflow in the back area below the trailer 16 in a desired direction to increase aerodynamic performance. The rear fairings 18, 58 are located rearward of the trailer tires 26, 28 and are located proximate to the back end 48 in the longitudinal direction 20. The rear fairings 18, 58 are arranged so that they angle inwards continuously towards the lateral centerline 72 in the lateral direction 22 upon extension of the rear fairings 18, 58 forward to rearward in the longitudinal direction 20. At no point moving forward to backward in the longitudinal direction 22 do the rear fairings 18, 58 ever extend outboard in the lateral direction 22 away from the lateral centerline 22. The inboard, angled orientation of the rear fairings 18, 58 functions improve aerodynamic performance at a location under the back end of the trailer 16. However, the angled orientation of the rear fairings 18, 58 introduces interference under the trailer 16 such that the rearward and forward trailer tires 26, 28 cannot be moved backwards in the longitudinal direction 20 or else they will hit the rear fairings 18, 58 and their movement prevented. Additionally, trailers 16 have bumpers on their back end that is required for crash safety, and these bumpers may prevent the rear fairings 18, 58 from extending all the way to the back end of the trailer 16 and/or may interfere with the aerodynamic flow benefits the rear fairings 18, 58 create. Although rear fairings 18, 58 exist to improve aerodynamic performance, their air flow surfaces are not optimized to maximize aerodynamic benefit of the vehicle. As such, room for variation and improvement exists in the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side view of a tractor trailer in accordance with the prior art.

FIG. 2 is a top view of FIG. 1.

The use of identical or similar reference numerals in different figures denotes identical or similar features.

DETAILED DESCRIPTION OF THE INVENTION

Figure 3:
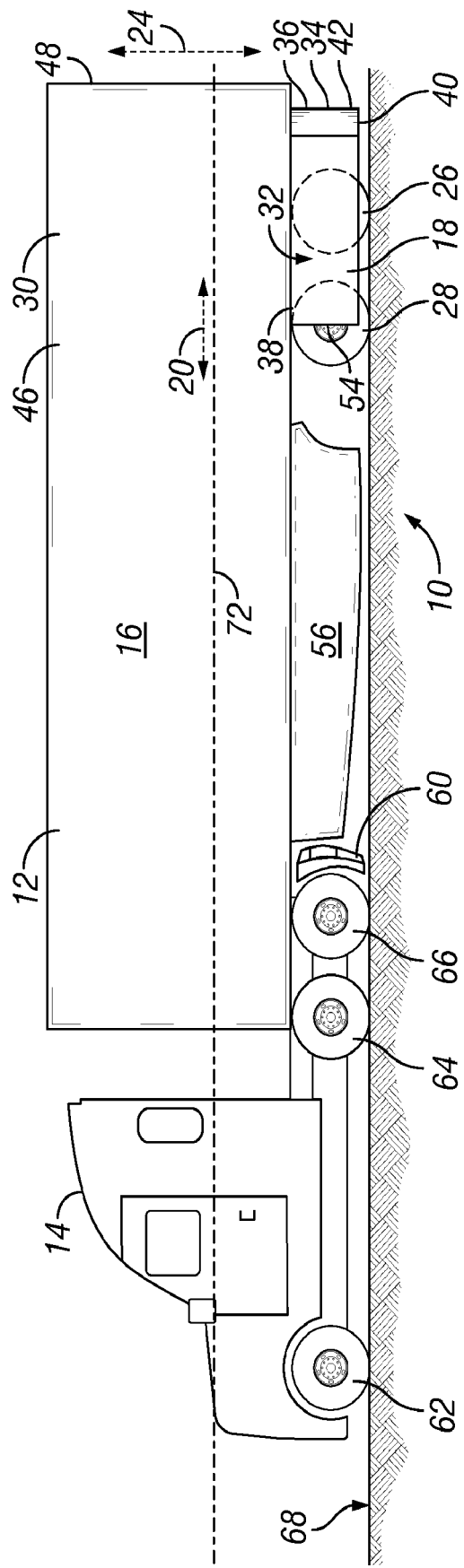
FIG. 3 is side view of the tractor trailer with the aerodynamic system.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

An aerodynamic system 10 is provided that includes a rear fairing 18 that is used to direct the flow of air passing over the rear fairing 18 when a tractor trailer 12 is driven. The rear fairing 18 has a kick out 34 that causes air flow to travel behind the trailer 16 to increase the aerodynamic performance of the tractor trailer 12. The kick out 34 is arranged so that it extends outboard in the lateral direction 22 and then back inboard in the lateral direction 22 upon extension forward to rearward in the longitudinal direction 20. The rear fairing 18 can be arranged so that it provides clearance for the rearward and/or forward trailer tires 26, 28 to move next to the rear fairing 18 in the longitudinal direction 20.

Figure 4:
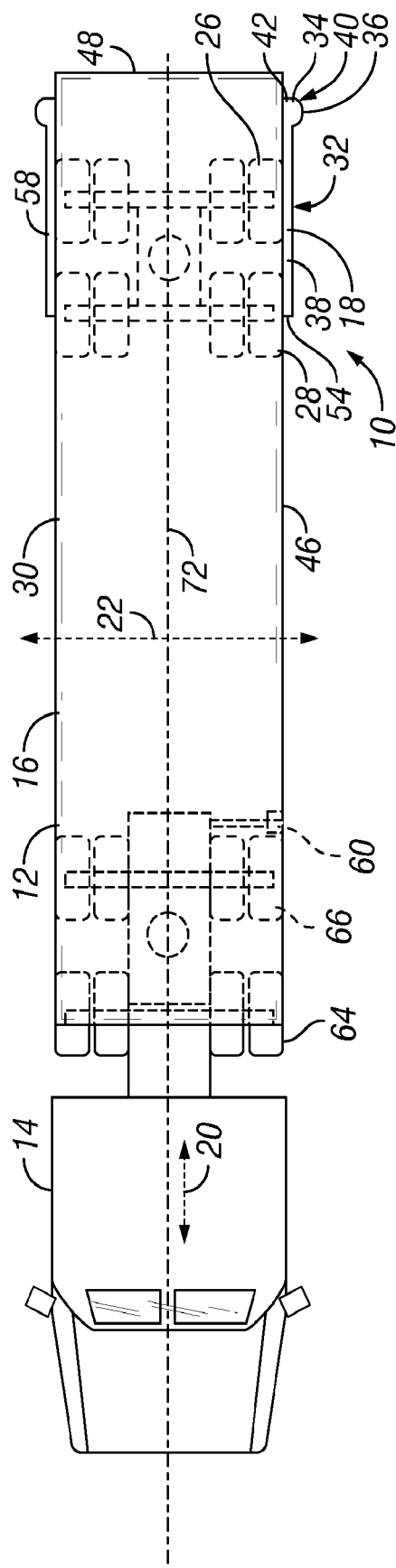
FIG. 4 is a top view of FIG. 3.

The aerodynamic system 10 described herein is used in connection with a tractor trailer 12 that includes tires which are heavy duty truck tires as shown in FIGS. 3 and 4. In this regard, the tires described herein are not designed for nor used with a car, motorcycle, or light truck (payload capacity less than 4,000 pounds), but are instead designed for and used with heavy duty trucks such as 18 wheelers, garbage trucks, or box trucks. The tractor trailer 12 includes a tractor 14 that is attached to and pulls a trailer 16 that is filled with cargo. The tractor 14 is the portion of the unit that includes the engine, and the trailer 16 is the portion of the unit that has a cargo area 30 that stores the cargo that is desired to be transported. The tractor trailer 12 is sometimes referred to as a semi-trailer truck, a tractor trailer, an eighteen wheeler (referring to the number of tires on the entire unit), a transport truck, or various other names. Although shown as being a single trailer 16, the trailer 16 can be made of two or three trailers in other embodiments. The tractor 14 includes steer tires 62 at the front end of the tractor 14 that can turn the tractor 14 left or right and includes forward drive tires 64 and rearward drive tires 66 that transmit motion from the engine onto the ground to drive the tractor 14 forward. The drive tires 64, 66 could be dual tires or singles and can be on the right and left hand side of the tractor 14. The steer tires 62 on the left and right hand side of the tractor 14 are usually single wide tires and not dual tires.

FIGS. 3 and 4 show an aerodynamic system 10 on a tractor trailer 12 that functions to achieve aerodynamic gains during driving of the vehicle. The aerodynamic system 10 has a rear fairing 18 located on one side of the trailer 16 of the tractor trailer 12. The trailer 16 has a lateral centerline 72 that is located in the middle of the trailer 16 in the lateral direction 22, and the rear fairing 18 is spaced from the lateral centerline 72 in the lateral direction 22 and is located on the left side of the trailer 16. The trailer 16 has a cargo area 30 into which the cargo carried by the tractor trailer 12 is located, and the rear fairing 18 is located lower than the bottom of this floor of the cargo area 30 in the vertical direction 24 of the trailer 16. The trailer 16 has a back end 48 that is the rearward most point of the trailer 16 in the longitudinal direction 20 of the trailer 16. The rear fairing 18 is located closer to the back end 48 in the longitudinal direction 20 than to a front end of the trailer 16 or to the tractor 14. The rear fairing 18 can be attached to the side of the cargo area 30 or can be attached to the bottom of the floor of the cargo area 30.

The trailer 16 includes rearward and forward trailer tires 26 and 28. The forward trailer tires 28 are located forward of the rearward trailer tires 26 in the longitudinal direction 20. Four forward trailer tires 28 and four rearward trailer tires 26 are shown. The forward trailer tires 28 can be a set of dual tires on the left hand side of the lateral centerline 72, and a set of dual tires on the right hand side of the centerline 72. Likewise, the rearward trailer tires 26 may be a set of dual tires on the left and a set of dual tires on the right side of the centerline 72. In other embodiments, instead of using sets of dual tires, the forward and rearward tires 26, 28 can be single wide based tires such that two forward tires 28 and present and such that two rearward tires 26 are present. As used herein, when referring to the forward trailer tire 28 it is to be understood that the forward trailer tire can be a single tire, a set of dual tires, or any number of tires located forward of the rearward trailer tire 26. Likewise, as used herein the term rearward trailer tire 26 may include just a single tire or any number of tires located rearward of the forward trailer tire 28 in the longitudinal direction 20 and tires of the tractor trailer 12 located closest to the back end 48 in the longitudinal direction 20.

The rear fairing 18 can be located in the longitudinal direction 20 at the same position as the back end 48 or may in some instances be located rearward of the back end 48 in the longitudinal direction 20. In the embodiment shown, the rearward terminal end 42 of the rear fairing 18 is located forward of the back end 48 in the longitudinal direction 20. However, in other embodiments the rearward terminal end 42 is at the same location as the back end 48 or rearward of the back end 48 in the longitudinal direction 20. The rear fairing 18 can extend forward in the longitudinal direction 20 to a forward terminal end 54. The forward terminal end 54 is located at the same position as the forward trailer tire 28 in the longitudinal direction 20 but may extend forward of the forward trailer tire 28 in the longitudinal direction 20 in other embodiments. In still other arrangements, the forward terminal end 54 may be at or rearward of the rearward trailer tire 26 in the longitudinal direction 20. A trailer skirt 56 is spaced from the rear fairing 18 in the longitudinal direction 20 and is free from contact therewith and is attached to the trailer 16 and functions to direct airflow under the trailer 16 in a desired manner. The forward fairing 60 is attached to the tractor 14 and is forward of the trailer skirt 56 in the longitudinal direction 20 and is spaced and free from contact therefrom.

The rear fairing 18 is located on the left hand side of the trailer 16 and is located completely outboard from a side edge 46 of the cargo area 30 of the trailer 16 in the lateral direction 22. The rear fairing 18 is a solid piece that has an air flow surface 32 over which air travels and a solid kick out 34 also over which air travels located rearward from the air flow surface 32 in the longitudinal direction 20. Some or a majority of the air flow surface 32 may be in the same plane as the side edge 46 or parallel to the plane of the side edge 46. On the opposite right side of the trailer 16 a second fairing 58 is present and is configured and positioned similarly to the first rear fairing 18 on the left hand side. The rear fairings 18, 58 do not have any portions located inboard of the sides 46 of the cargo area 30 in the lateral direction 22 and this feature allows the rearward and forward trailer tires 26, 28 to move in the longitudinal direction 20 forward and backwards so that they could occupy the same position in the longitudinal direction 20 as the rear fairings 18, 58.

Figure 5:
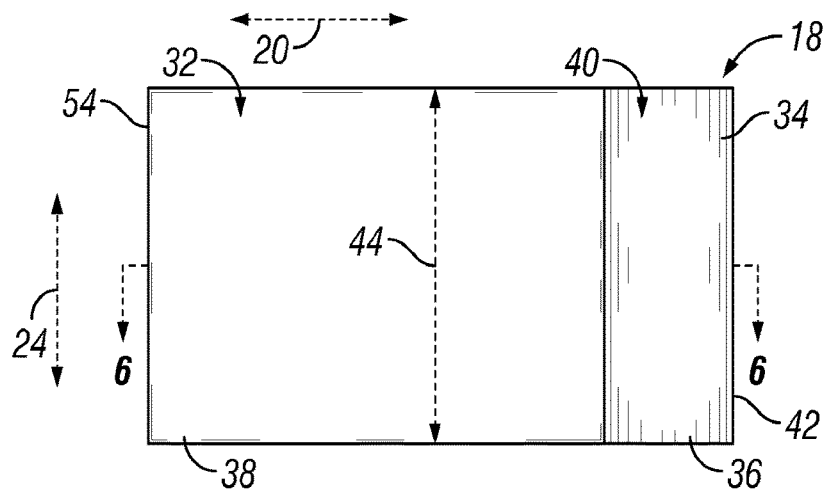
FIG. 5 is a side elevation view of the rear fender.
Figure 6:
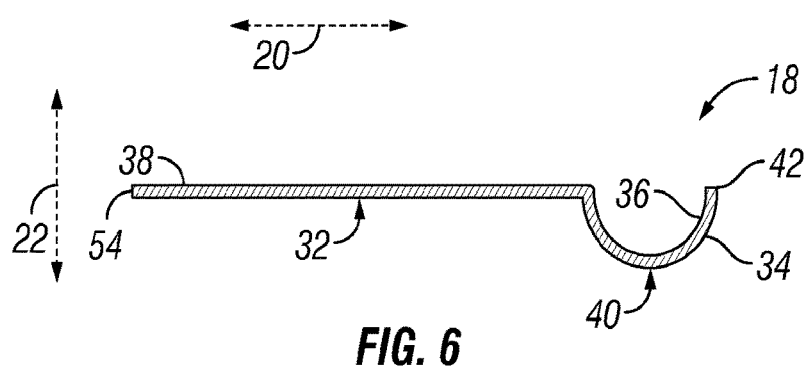
FIG. 6 is a cross-sectional view taken along line 6-6 of FIG. 5.
Figure 7:
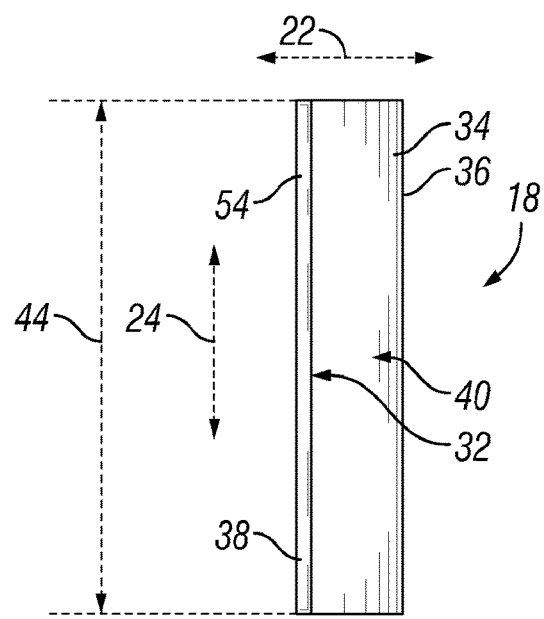
FIG. 7 is a front elevation view of the rear fender of FIG. 5.

FIGS. 5-7 show one exemplary embodiment of the rear fairing 18, it being understood that the second fairing 58 could be constructed in a similar manner. The rear fairing 18 has a leading end 38 located at the forward end of the rear fairing 18 in the longitudinal direction 20. The forward terminal end 54 is the portion of the leading end 38 located most forward in the longitudinal direction 20. The air flow surface 32 is the portion of the rear fairing 18 that is oriented outboard in the lateral direction 22 so that air flows against this air flow surface 32 during travel and is directed across the air flow surface 32 is a desired manner. The air flow surface 32 may include various features, grooves, depressions, or projections on it and need not be a flat surface in different exemplary embodiments. The air flow surface 32 may transition to and engage a kick out surface 40 of the kick out 34 and the air can continue flowing from the air flow surface 32 to over and around the kick out surface 40. The tailing end 36 of the rear fairing 18 includes the kick out 34 which extends from the air flow surface 32 to the rearward terminal end 42 of the tailing end 36. The kick out 34 may be integrally formed with the air flow surface 32 so that they are one integral piece, or these various components 32, 34 can be made out of multiple pieces that are attached to one another.

The rear fairing 18 has a height 44 in the vertical direction 24, and the kick out 34 may extend along the entire height 44. In other embodiments, the kick out 34 does not extend along the entire height 44. Further, although shown as being continuous along the entire height 44, the kick out 34 may be discontinuous in other arrangements so that it is at an upper and lower portion in the vertical direction 24 and a section of the air flow surface 32 is between these two sections in the vertical direction 24. The rear fairing 18 is a planar component having a consistent thickness along its entire longitudinal length. The kick out 34 is a discontinuity in the shape of the rear fairing 18, and this discontinuity functions to increase the strength of the rear fairing 18 as the discontinuity strengthens its flat, planar shape. The kick out 34 forms a void from the back of the kick out 34 to the back of the air flow surface 32.

The kick out surface 40 extends across the entire kick out 34 and extends outboard in the lateral direction 22 and then subsequently inboard in the lateral direction 22 upon extension of the kick out surface 40 forward to rearward in the longitudinal direction 20. The kick out surface 40 is disclosed in this embodiment as being a convex surface in which the inboard extension occurs immediately after the outboard extension and in which the end of the kick out surface 40 extends to and is located at the rearward terminal end 42. The transition of the air flow surface 32 to the kick out surface 40 can include a fillet or round or other feature to facilitate air flow or can be as that shown in which the transition area is more abrupt. Applicant has unexpectedly discovered that the inclusion of a kick out surface 40 in a rear fairing 18 that extends outboard in the lateral direction 22 increases aerodynamic gains of the tractor trailer 12. Applicant theorizes that the laterally outboard kickout adjusts the air flow pattern behind the trailer 16 closer to the ground 68 in the vertical direction 24 in a manner that reduces drag.

Figure 8:
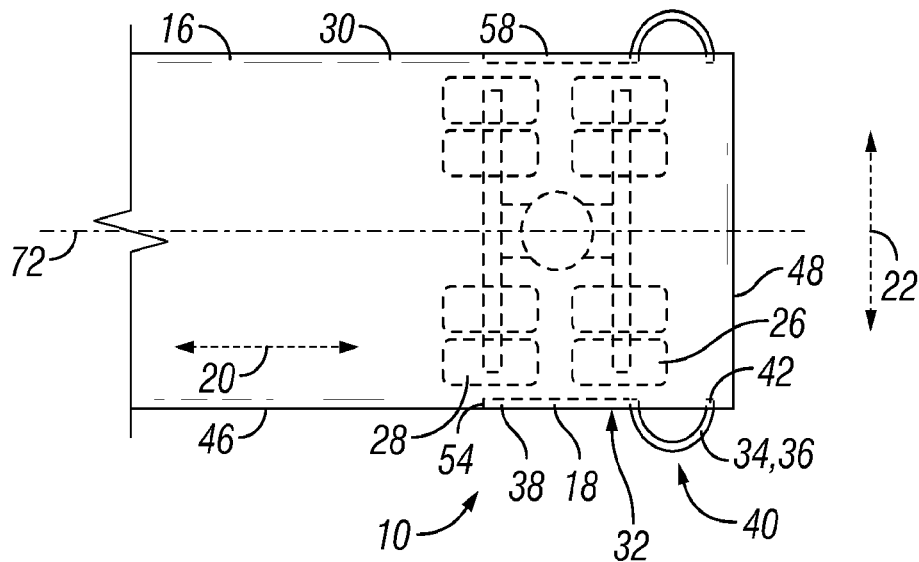
FIG. 8 is a top view of the rearward section of the trailer with the rear fairings partially inboard and partially outboard of the side edges of the trailer.

Another embodiment of the aerodynamic system 10 is shown with reference to FIG. 8 in which the rear portion of the trailer 16 is shown. The rearward and forward trailer tires 26, 28 are free to move without obstruction by the rear fairings 18, 58 both forward and backwards in the longitudinal direction 20. The rear fairings 18, 58 are constructed in the same geometry as previously discussed with respect to the embodiment in FIGS. 5-7. A portion of the rear fairing 18 is outboard from the side edge 46 in the lateral direction 22, and a portion of the rear fairing 18 is inboard from the side edge 46 in the lateral direction 22. The forward terminal end 54, air flow surface 32, and leading end 38, and rearward terminal end 42 and a portion of the kick out 34 are all located inboard of the side edge 46 in the lateral direction 22. The majority of the kick out 34 is located outboard of the side edge 46 in the lateral direction 22. The second fairing 58 is arranged in a similar manner in which its leading edge, forward terminal end, air flow surface, and a minority of its kick out are located inboard of the right side edge of the cargo area 30 in the lateral direction 22, while the majority of its kick out and the majority of its kick out surface are located outboard of the right side edge in the lateral direction 22.

Figure 9:
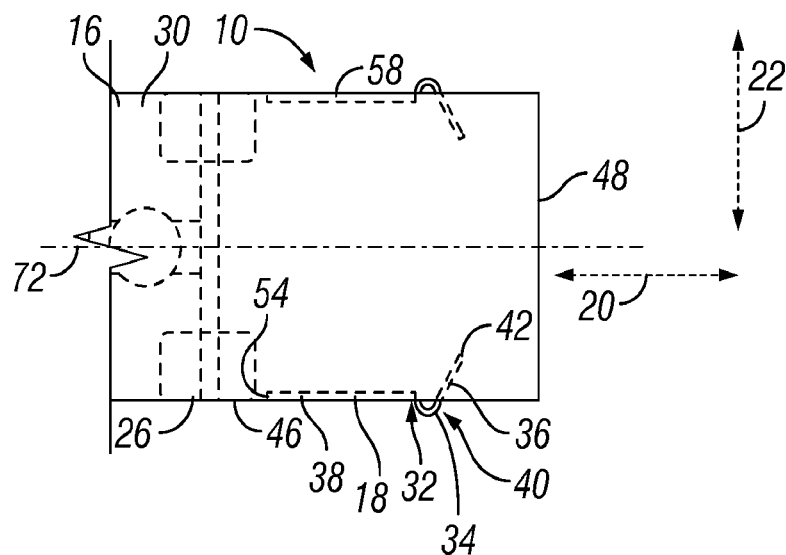
FIG. 9 is a top view of the rearward section of the trailer with the rear fairings configured in yet another arrangement.

Another embodiment is shown in FIG. 9 in which again the air flow surface 32 and some of the kick out surface 40 are inboard of the side edge 46 while the majority of the kick out surface 40 is outboard. This embodiment differs in that the kick out surface 40 is not located at the rearward terminal end 42. Instead, the tailing end 36 in addition to including the kick out 34 also includes a straight segment that extends from the inboard extending portion of the kick out 34 to the rearward terminal end 42. Air can flow over and around the kick out surface 40 and then across this straight section of the tailing end 36, and the rearward terminal end 42 may be spaced from the back end 48 in the longitudinal direction 20. The tires 26, 28 could be blocked by the forward terminal end 54 and prevented from moving past even a portion of the rear fairings 18, 58. Alternatively, the tires 26, 28 could be arranged so that they do move past the air flow surface 32 and kick out 34 but engage the straight section after the kick out 34 to be prevented from further rearward movement in the longitudinal direction 20. The second fairing 58 can be arranged in the same manner as previously discussed with respect to the first rear fairing 58.

Figure 10:
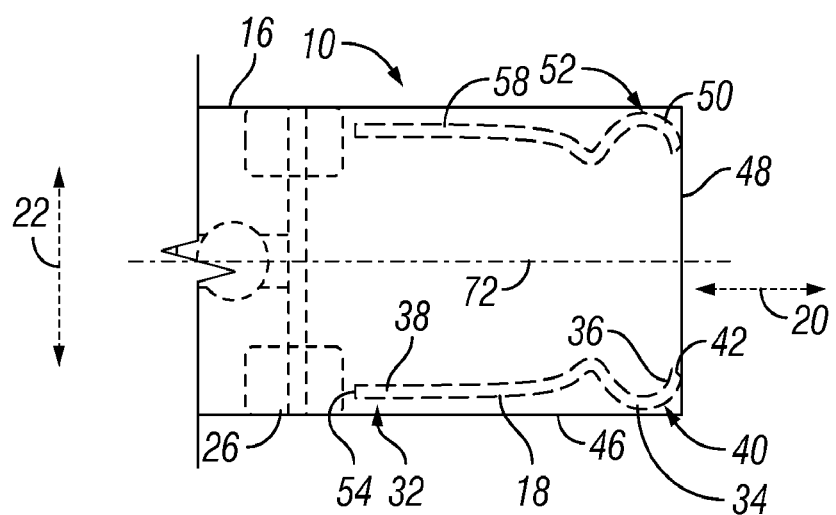
FIG. 10 is a top view of the rearward section of the trailer with the rear fairings completely inboard of the side edges of the trailer in accordance with yet another embodiment.

The shape of the rear fairing 18 can be further modified as shown with reference to FIG. 10. Here, the air flow surface 32 is not a flat, planar surface but instead tapers inboard in the lateral direction 22 upon extension rearward from the forward terminal end 54. This tapering terminates at a further inboard extending concave section which then transitions to the kick out 34. The kick out 34 has a kick out surface 40 that again is a convex surface that extends from this concave surface of the air flow surface 32 to the rearward terminal end 42. As such, it is to be understood that the air flow surface 32 can be variously shaped and configured in other exemplary embodiments.

Figure 11:
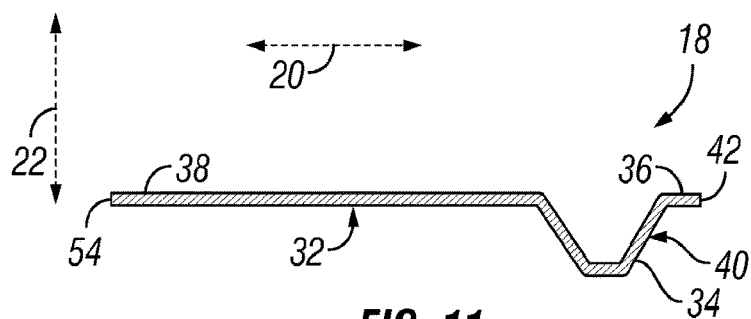
FIG. 11 is a cross-sectional view of the rear fairing in accordance with another embodiment.

A cross-sectional view of another embodiment of the rear fairing 18 is illustrated in FIG. 11. The kick out 34 does not have a convex shape. Instead, the kick out 34 is angular in shape but still has a kick out surface 40 that extends outboard from the air flow surface 32 in the lateral direction 22. Next, the kick out surface 40 extends rearward in the longitudinal direction 20 but does not change positions in the lateral direction 22 for some amount. The kick out surface 40 then extends inboard in the lateral direction 22 until it's at the same lateral position as the air flow surface 32. A small portion of the tailing end 36 extends rearward in the longitudinal direction 20 to the rearward terminal end 42 and has a location in the lateral direction 22 that is the same as the air flow surface 32. It is to be understood that the kick out 34 can be variously shaped and may or may not be located at the rearward terminal end 42 in various embodiments. However, the kick out 34 will always have an air flow surface 40 that extends outboard and then inboard in the lateral direction 22. The kick out 34 air flow surface 40 may have multiple curved or flat sections, parallel to or angled to the longitudinal direction, in other embodiments.

Figure 12:
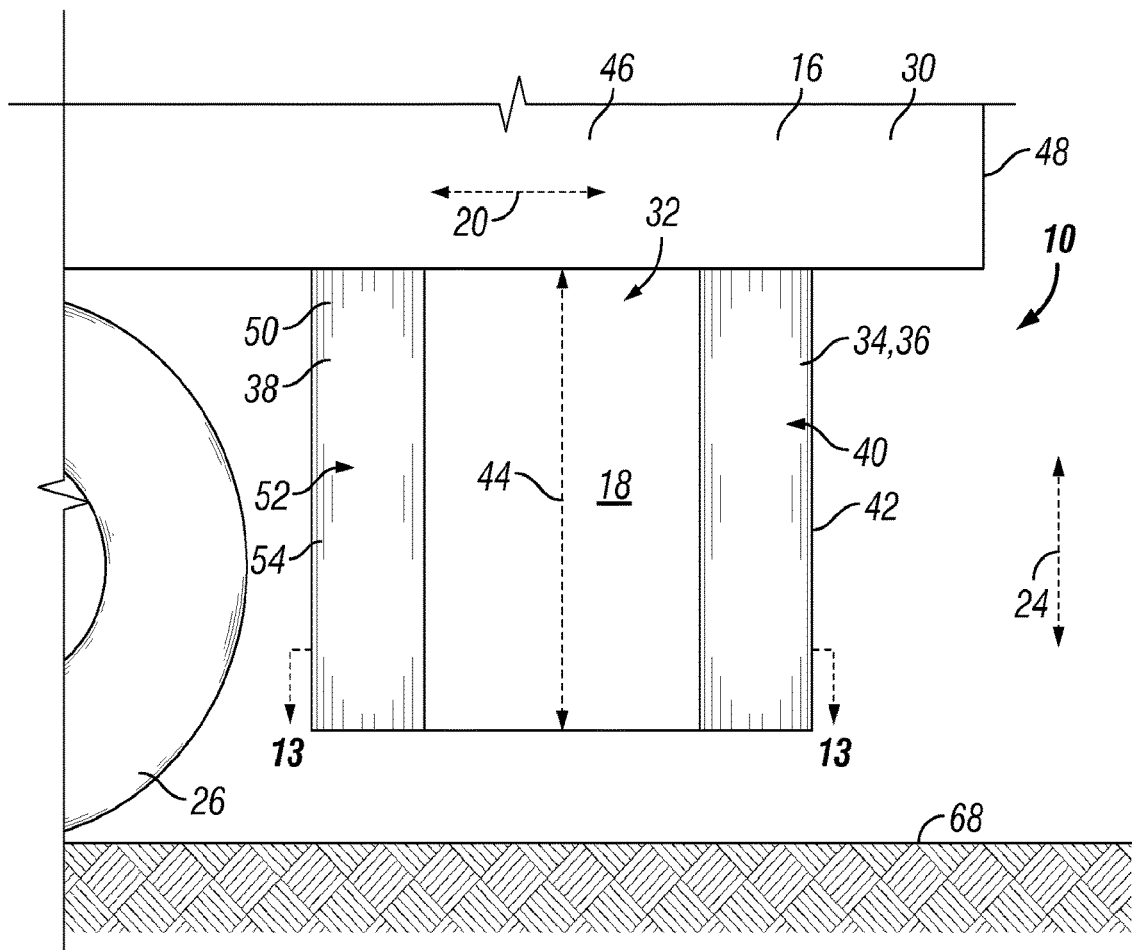
FIG. 12 is a side elevation view of the rearward section of the trailer with the rear fairing in accordance with another embodiment.
Figure 13:
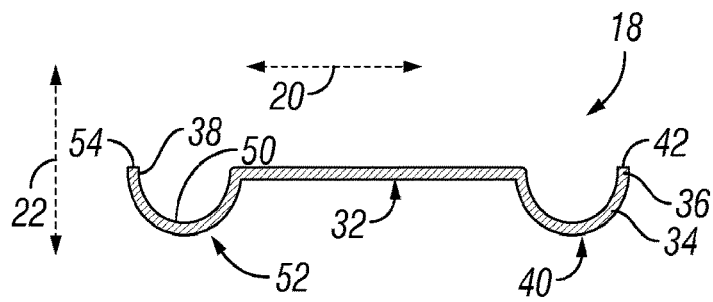
FIG. 13 is a cross-sectional view taken along line 13-13 of FIG. 12.

FIGS. 12 and 13 show an alternative exemplary embodiment in which the rear fairing 18 in addition to including the kick out 34 includes a second kick out 50 that has a second kick out surface 52 located at the leading end 38. The second kick out surface 52 is at the forward terminal end 54 and extends to the air flow surface 32. The second kick out surface 52 has a portion that extends from the forward terminal end 54 outboard in the lateral direction 22 and then inboard in the lateral direction 22 upon extension rearward in the longitudinal direction 20. The second kick out surface 52 is convex in shape and a void is formed inboard of the second kick out surface 52. The second kick out surface 52 can be configured in the same manner as the first kick out surface 40 or may be arranged differently in other embodiments. The second kick out surface 52 could be variously configured as described herein with respect to the first kick out surface 40. The second kick out surface 52 may extend along the entire height 44 of the rear fairing 18 in the vertical direction 24. The rear fairing 18 is spaced some amount from the ground 68 in the vertical direction 24 and may extend along a majority of the distance in the vertical direction 24 from the bottom of the cargo area 30 to the ground 68. Testing has shown that the presence of the second kick out surface 52 at the leading end 38 does not cause a measurably negative impact on the aerodynamic gains. The inclusion of the second kick out surface 52 allows the same shape rear fairing 18 to be used on either the left or right hand side of the trailer 16.

Figure 14:
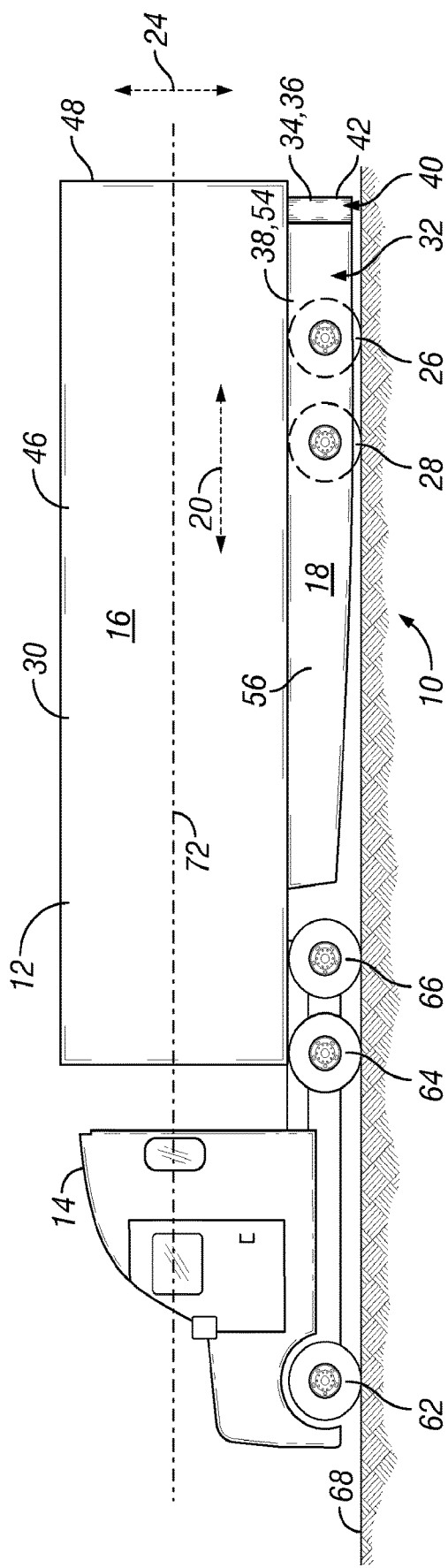
FIG. 14 is a side elevation view of a tractor trailer with the aerodynamic system including an integrally formed trailer skirt and rear fairing.

As described, the rear fairing 18 is a separate component from the trailer skirt 56 and is spaced from and free from contact with the trailer skirt 56 in the longitudinal direction 20. However, in other embodiments the rear fairing 18 can engage the trailer skirt 56 as shown for example in FIG. 14. In this embodiment, the trailer skirt 56 is carried by the trailer 16 and has a forward end that is located just rearward of the rearward drive tire 66. The rear fairing 18 is integrally formed with the trailer skirt 56 and a distinct boundary line is not present. The rear fairing 18 extends from the rearward terminal end 42 to the forward terminal end 54, and the forward terminal end 42 is just rearward of the rearward trailer tire 26 in the longitudinal direction 20. The trailer skirt 56 and the rear fairing 18 are made of the same material and have the same thickness and are integrally formed with one another. In other embodiments, they 56, 18 may be different components but can engage one another. The kick out 34 can be arranged in the same manner as previously discussed.

Figure 15:
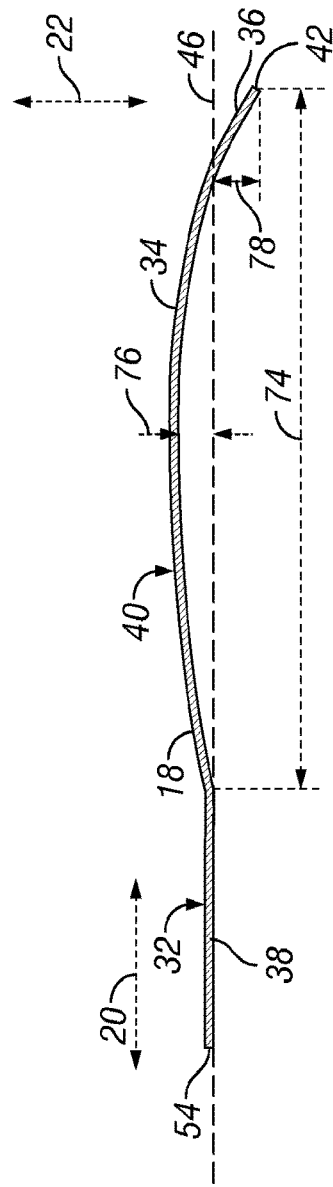
FIG. 15 is a top plan view of the rear fairing with the side of the trailer shown in dashed lines.

Another embodiment of the rear fairing 18 is shown in FIG. 15 as attached to the side edge 46 which is in dashed lines. The geometry of the rear fairing 18 is set up so that the kick out 34 extends longer than the rest of the rear fairing 18 in the longitudinal direction 20. The kick out 34 has a distance 74 that is 25 inches in this disclosed embodiment. Further, upon extension in towards the lateral centerline 72 in the lateral direction 22, the kick out 34 extends a distance 78 that is 1.2 inches inboard from the side edge 46. The rearward terminal end 42 is thus located the 1.2 inch distance 78 inboard in the lateral direction 22 from the side edge 46. The peak outboard extension of the kick out 34 in the lateral direction 22 is measured as distance 76 from the side edge 46. In some instances, distance 76 is 1 inch. As such, the kick out surface 40 has a maximum distance 76 that is 1 inch from the side edge 46 in the lateral direction 22. The air flow surface 32 has a length of 11 inches from the forward terminal end 54 to the start of the kick out 34 in the longitudinal direction 20.

Figure 16:
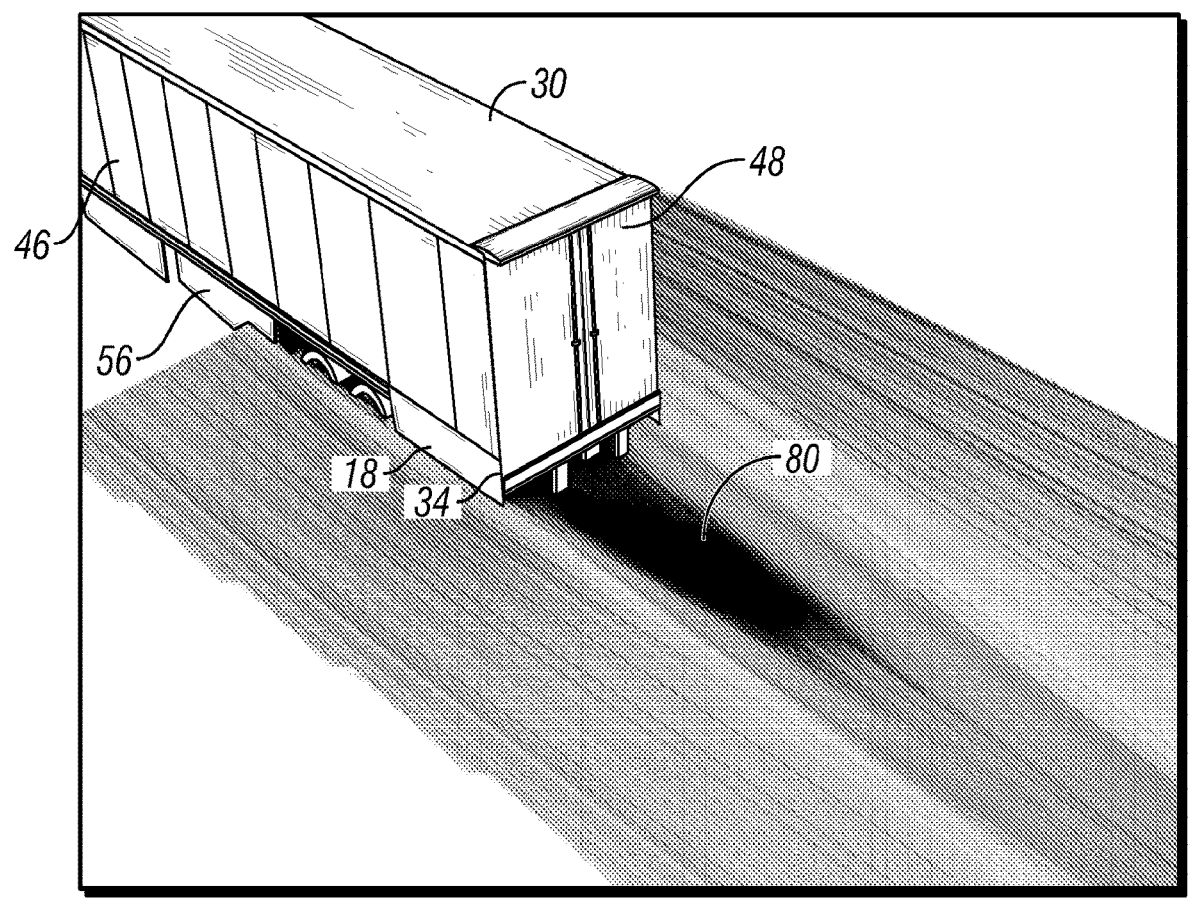
FIG. 16 is a rear perspective view of a trailer having a rear fairing without a kick out showing the wake distribution upon forward travel.
Figure 17:
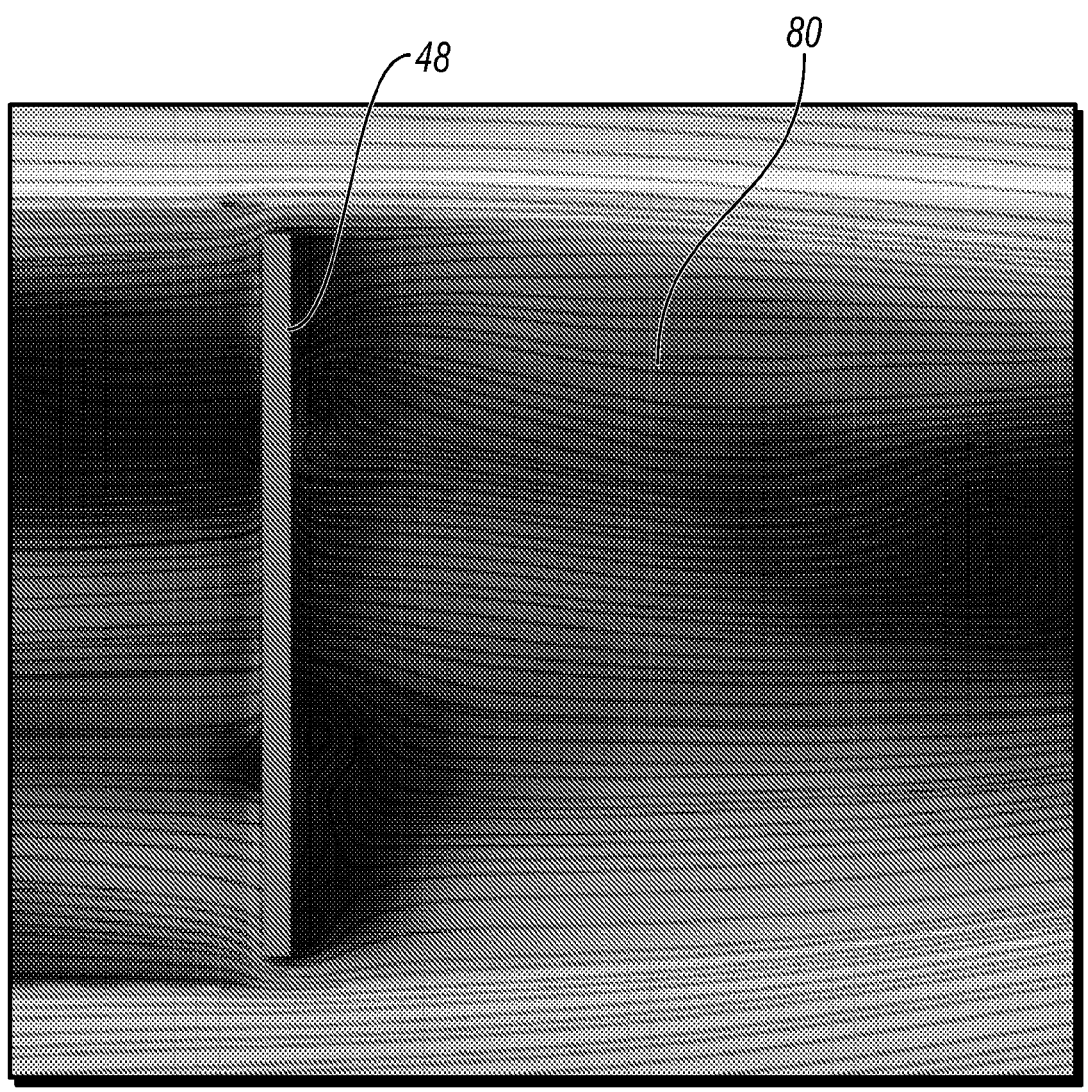
FIG. 17 is a top plan view of the wake distribution behind the trailer of FIG. 16.
Figure 18:
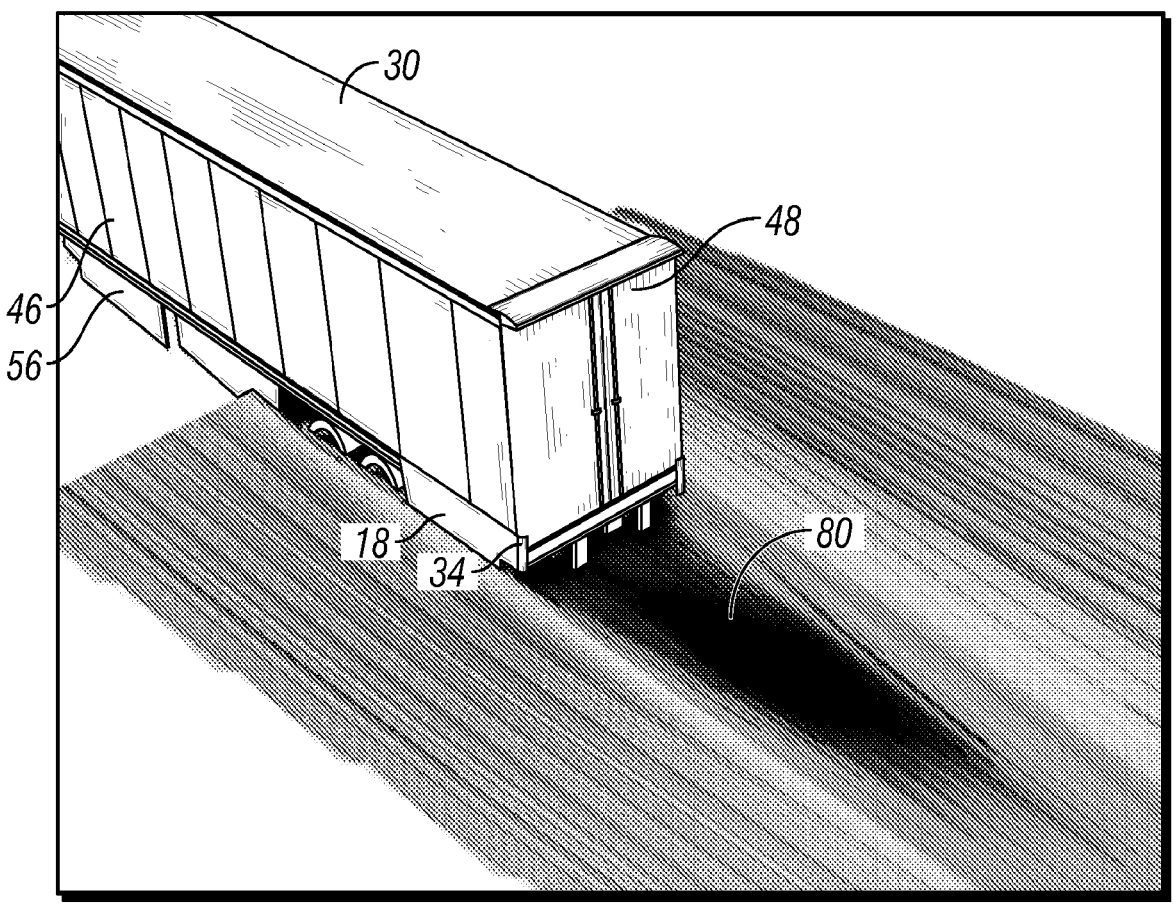
FIG. 18 is a rear perspective view of a trailer having a rear fairing with kick out showing the wake distribution upon forward travel.
Figure 19:
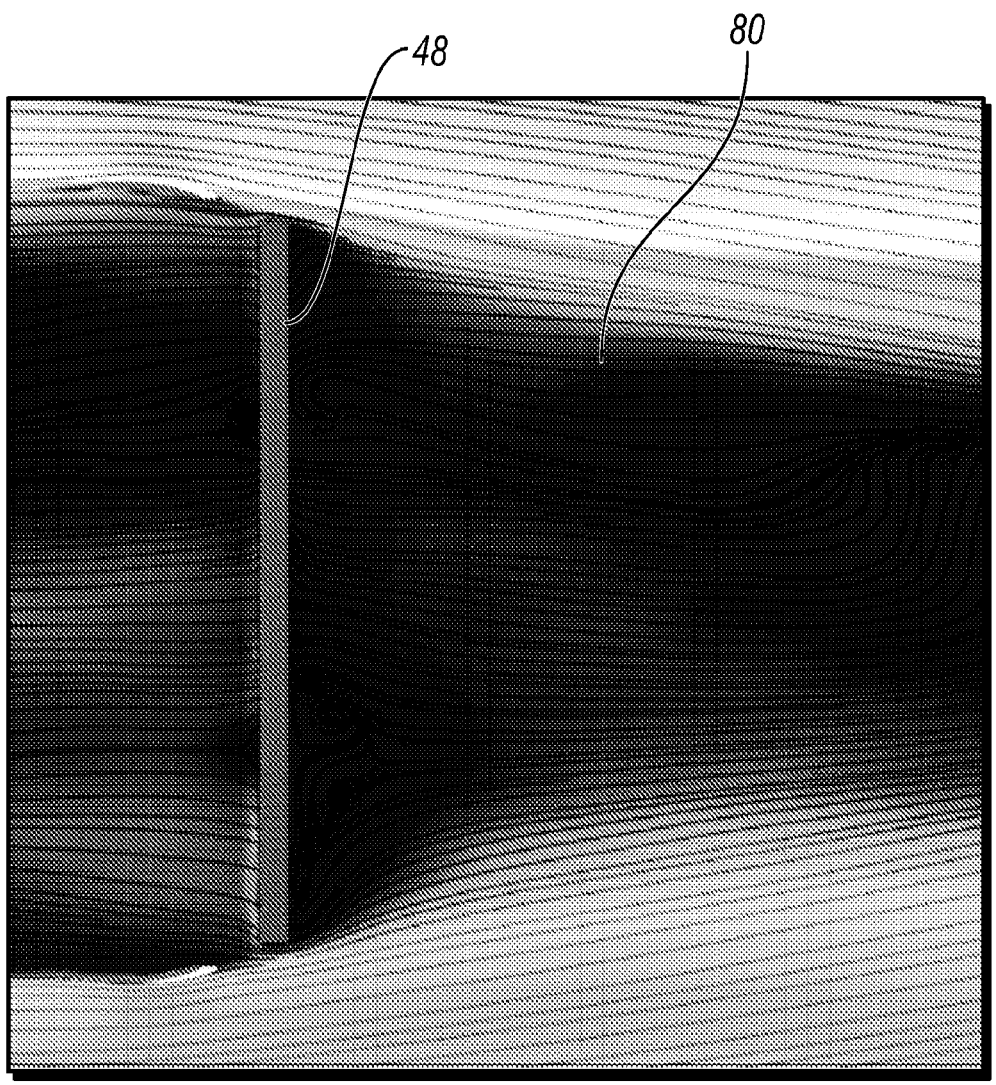
FIG. 19 is a top plan view of the wake distribution behind the trailer of FIG. 18.

Tests were conducted with the rear fairing 18 of FIG. 15 to determine the effect of the presence of the kick out 34 on the rear wake 80. FIGS. 16 and 17 illustrate the cargo area 30 with the trailer skirt 56 and the rear fairing 18 in which the rear faring 18 does not have the kick out 34. The strength and size of the rear wake 80 behind the cargo area 30 of the trailer 16 is shown and the concentrated area directly behind the cargo area 30 has a lower pressure which correlates with larger wind resistance and increased fuel consumption. FIGS. 18 and 19 are the same as in FIGS. 16 and 17 with the exception that the rear fairing 18 has the kick out 34. The rear wake 80 is different in shape, with the addition of the kick out 34, and the concentrated area directly behind the cargo area 30 is smaller than that of the rear wake 80 without the kick out 34 in FIGS. 16 and 17. The darker and lighter areas show different amounts of wind resistance. There is less lower pressure behind the cargo area 30 and this correlates with less wind resistance and decreased fuel consumption from the non-kick out 34 layout of FIGS. 16 and 17.

A measured drag reduction from a rear fairing 18 design, on both right and left hand sides of the trailer 16, that does not have a kick out 34 to one that has a kick out 34 has been measured to have a drag reduction of 0.5% to 1%. This reduction in drag from adding the kick outs 34 to the left and right hand rear fairings 18 results in a fuel savings of 0.25% to 0.5%. The profile disclosed in FIG. 15 results in a 0.8% reduction in drag when added to the left and right rear fairings 18. The test methods for fuel consumption are standard test method SAE J1321.

It is to be understood that the rear fairings 18, 58 are carried by the trailer 16 and are positioned lower than the floor of the cargo area 30 in the vertical direction 24, as opposed to trailer fairings that are located on the right and left sides walls of the cargo area 30 and extend along a portion of the height of the right and left side walls in the vertical direction 24. These fairings share some of the same positions in the vertical direction 24 as does the cargo area 30. The rear fairings 18, 58 discussed presently are those of the trailer 16 that are vertically below the cargo area 30 in the vertical direction 24, and in particular vertically below the bottom of the cargo area 30.

The rear fairing 18 has the air flow surface 32 and includes the kick out 34 which has the kick out surface 40 which first extends outboard in the lateral direction 22. This outboard extension o the kick out surface 40 causes the air flow across it to accelerate and lower the pressure on the kick out surface 40. The kick out surface 40 then smoothly curves back towards the lateral centerline 72 either to the same plane as the air flow surface 32 of the main section or somewhat inboard of this plane of the air flow surface 32 in the lateral direction 22. This configuration turns the air flow towards the lateral centerline 72 and initiates collapse of the wake structure of the flow. The kick out surface 40 increases the amount of surface area of the overall tractor trailer 12 in the lateral direction 22 presenting a greater surface area profile for air to hit and potentially slow the vehicle down. A common design goal is to reduce the area of the overall tractor trailer 12 presented to the air flow to in turn reduce drag, so the inclusion of the addition of area presented by the kick outs 34 to increase area presented to engage air flow upon forward driving of the tractor trailer 12 goes again standard design.

The presence of the kick out 34 also functions as a stiffening element of the rear fairing 18. The kick out 34 does this by increasing the moment area of inertia. The presence of the kick out 34 makes the rear fairing 18 harder to bend along an axis that extends in the longitudinal direction 20. A stiffer rear fairing 18 makes it vibrate or move less during travel of the tractor trailer 12 so that air flow over it is less turbulent and is more predictable to achieve more designed for results.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An aerodynamic system for a tractor trailer, comprising:
    a rear fairing configured for attachment to a trailer of a tractor trailer, wherein the trailer has a longitudinal direction, a lateral direction, and a vertical direction, wherein the trailer has a rearward trailer tire and a forward trailer tire, wherein the trailer has a cargo area and wherein the rear fairing is configured for being located in the vertical direction lower than the cargo area;
    wherein the rear fairing has an air flow surface facing outboard in the lateral direction, and wherein the rear fairing has a kick out located at a tailing end of the rear fairing in the longitudinal direction, wherein the kick out has a kick out surface that upon extension rearward in the longitudinal direction extends outboard in the lateral direction and then inboard in the lateral direction, wherein the kick out is located rearward of the forward trailer tire in the longitudinal direction.

2. The aerodynamic system as set forth in claim 1, wherein the kick out surface is convex in shape such that the outboard extension of the kick out surface in the lateral direction is immediately forward in the longitudinal direction and engages the inboard extension of the kick out surface in the lateral direction.

3. The aerodynamic system as set forth in claim 1, wherein the air flow surface engages the kick out surface.

4. The aerodynamic system as set forth in claim 1, wherein the kick out is located at a rearward terminal end of the tailing end of the rear fairing.

5. The aerodynamic system as set forth in claim 1, wherein the kick out extends along an entire height of the rear fairing in the vertical direction.

6. The aerodynamic system as set forth in claim 1, wherein the kick out is configured for being located rearward of the rearward trailer tire in the longitudinal direction.

7. The aerodynamic system as set forth in claim 1, wherein at least a portion of the kick out is configured for being located inboard of a side edge of the cargo area in the lateral direction and lower than the cargo area in the vertical direction so as to be configured to be under the cargo area.

8. The aerodynamic system as set forth in claim 7, wherein a rearward terminal end of the tailing end of the rear fairing is configured for being located inboard of the side edge of the cargo area in the lateral direction and lower than the cargo area in the vertical direction and forward of a back end of the cargo area in the longitudinal direction so as to be configured to be under the cargo area.

9. The aerodynamic system as set forth in claim 7, wherein a portion of the kick out is configured for being located outboard of the side edge of the cargo area in the lateral direction.

10. The aerodynamic system as set forth in claim 1, wherein the entire kick out is configured for being located outboard of a side edge of the cargo area in the lateral direction.

11. The aerodynamic system as set forth in claim 1, wherein the kick out is a first kick out, and wherein the rear fairing has a second kick out with a second kick out surface that upon extension rearward in the longitudinal direction extends outboard in the lateral direction and then inboard in the lateral direction, wherein the second kick out is located at a leading end of the rear fairing in the longitudinal direction, and wherein the air flow surface is located between the first kick out and the second kick out in the longitudinal direction.

12. The aerodynamic system as set forth in claim 11, wherein the air flow surface engages both the first kick out surface and the second kick out surface, and wherein the second kick out is located at a forward terminal end of the leading end of the rear fairing.

13. The aerodynamic system as set forth in claim 1, further comprising a trailer skirt that is configured for being located lower than the cargo area in the vertical direction, wherein the trailer skirt is configured for being located forward of the forward trailer tire in the longitudinal direction, wherein the trailer skirt is configured for being carried by the trailer, and wherein the rear fairing is integrally formed with the trailer skirt and extends rearward from the trailer skirt in the longitudinal direction.

14. The aerodynamic system as set forth in claim 1, wherein the rear fairing is configured for allowing movement of the rearward trailer tire forward and rearward of a leading end of the rear fairing in the longitudinal direction.

* * * * *